United States Patent [19]
Cross et al.

[11] Patent Number: 6,026,473
[45] Date of Patent: Feb. 15, 2000

[54] METHOD AND APPARATUS FOR STORING DATA IN A SEQUENTIALLY WRITTEN MEMORY USING AN INTERLEAVING MECHANISM

[75] Inventors: Leonard W. Cross; Edward Paul Wallace, both of Portland, Oreg.

[73] Assignee: Intel Corporation, Santa Clara, Calif.

[21] Appl. No.: 08/771,847

[22] Filed: Dec. 23, 1996

[51] Int. Cl.[7] ............................. G06F 12/00; G06F 13/00
[52] U.S. Cl. ..................... 711/157; 711/154; 711/167; 365/230.04; 710/52; 710/53; 710/56
[58] Field of Search ................................. 711/117, 118, 711/125, 127, 130, 154, 157, 167; 365/230.04; 710/52, 55, 56

[56] References Cited

U.S. PATENT DOCUMENTS

| | | | |
|---|---|---|---|
| 4,558,429 | 12/1985 | Barlow et al. ............................ | 711/127 |
| 4,724,518 | 2/1988 | Steps ...................................... | 711/127 |
| 4,866,603 | 9/1989 | Chiba ..................................... | 711/127 |
| 5,051,889 | 9/1991 | Fung et al. .............................. | 711/157 |
| 5,189,319 | 2/1993 | Fung et al. . | |
| 5,386,537 | 1/1995 | Asano ..................................... | 711/157 |
| 5,412,788 | 5/1995 | Collins et al. .......................... | 711/157 |
| 5,453,708 | 9/1995 | Gupta et al. . | |
| 5,473,755 | 12/1995 | Dunning . | |
| 5,519,872 | 5/1996 | Khandekar et al. . | |
| 5,530,837 | 6/1996 | Williams et al. ........................ | 711/157 |
| 5,537,577 | 7/1996 | Sugimura et al. ....................... | 711/157 |
| 5,652,861 | 7/1997 | Mayo et al. ............................. | 711/157 |
| 5,664,122 | 9/1997 | Rabe et al. . | |
| 5,684,973 | 11/1997 | Sullivan et al. ........................ | 711/157 |
| 5,689,680 | 11/1997 | Whittaker et al. ...................... | 711/127 |
| 5,745,791 | 4/1998 | Peek et al. . | |

*Primary Examiner*—Tuan V. Thai
*Attorney, Agent, or Firm*—Blakely, Sokoloff, Taylor & Zafman LLP

[57] ABSTRACT

A method and apparatus for storing data values received within respective cycle periods of a clock signal are disclosed. Data values are alternately stored in first and second data hold registers and then output by each data hold register for a time greater than a cycle period of the clock signal. Address values at which the incoming data values are to be written are alternately stored in first and second address hold registers. Data stored in the first data hold register is written to a latch-based memory element in a first memory bank indicated by an address value stored in the first address hold register. Data stored in the second data hold register is written to a latch-based memory element in a second memory bank indicated by an address value stored in the second address hold register.

22 Claims, 8 Drawing Sheets

METHOD AND APPARATUS FOR STORING DATA IN A SEQUENTIALLY WRITTEN MEMORY USING AN INTERLEAVING MECHANISM

BACKGROUND OF THE INVENTION (1) Field of the Invention

The present invention relates to the field of data storage. More specifically, the present invention relates to a method and apparatus for storing data in a plurality of latch-based memory elements.

(2) Art Background

When data must be transferred between two different time domains, it is often necessary to buffer the data temporarily before transferring it to the recipient time domain. This is usually accomplished by using a first-in first-out (FIFO) memory structure to queue the data until it is requested by recipient hardware.

When implemented in an application-specific integrated circuit (ASIC), a FIFO memory structure generally includes storage elements to store the data, address decode circuitry to select a specific one of the storage elements, and write-address generation circuitry for generating a sequence of write addresses at which the data is to be written. The size of the FIFO buffer is determined by the number and data-width of the individual storage elements and, above a certain buffer size, the storage elements are the dominant power and gate consuming logic element of the FIFO buffer.

Storage elements can be characterized by the manner in which they are triggered to store data. Flip-flops, also known as registers, are edge-triggered devices and are the storage element of choice in prior-art FIFO buffer designs. At each gating edge of a signal received at a clock enable input of the flip-flop, the signal present at the data input of the flip-flop is transferred to the flip-flop output. Since the output of a flip-flop can change state only at edges of the gating signal, any data setup and hold time requirements are centered around the gating edge. Since the gating signal is most commonly the clock signal used to indicate that a new data value is present, a new data value is stored in the flip-flop just before new data is asserted at the flip-flop input. As a result, system timing is kept simple, state transitions are deterministic, and race conditions that are otherwise difficult to detect and debug are avoided.

A transparent latch is another type of storage element that can be used in a FIFO buffer. Transparent latches, or "latches" for short, are enabled by a signal level rather than a signal edge. Instead of the clock enable input of a flip-flop, a transparent latch has a level-driven enable input. When an active-level signal is asserted at the latch enable input, the latch is "enabled", and data at the latch data input is passed through to the latch output. The effect is to make an enabled latch appear "transparent" from input to output, hence the term "transparent latch". Later, when the signal at the latch enable input transitions from the active level to an inactive level, the data present at the latch input is "latched" at the latch output.

The primary advantage of using latches as data storage elements instead of flip-flops is that latch-based storage elements use less power and require fewer equivalent gates than flip-flop-based storage elements. Reduced power consumption and gate count are particularly significant if the FIFO buffer is to be implemented in an ASIC.

The main disadvantage of using latch-based storage elements instead of flip-flop-based storage elements is that latches are more difficult to control than flip-flops. Setup and hold time requirements must be satisfied relative to a disabling edge of the latch enable signal which, in many designs, may be out of phase with the system clock signal. As a result, race conditions can arise between the hold time necessary to latch the data and a subsequent edge of the system clock which signals the next data value. If insufficient hold time is provided, the subsequent data value may be latched instead of the desired data value. Due to the hold time problems associated with latches, it is common to either relax the rate of data throughput to provide greater setup and hold time or to use flip-flops instead.

It would be desirable, therefore, to implement a sequentially written memory such as a FIFO buffer using transparent latches as the storage elements, but without having to reduce FIFO data throughput.

BRIEF SUMMARY OF THE INVENTION

A method and apparatus for storing data in a plurality of sequentially addressed latch-based memory elements are disclosed. In the method of the present invention, data values, each received within a respective cycle period of a clock signal, are stored alternately in first and second hold registers. Each of the data values stored in the first and second hold registers is asserted at the input of a latch-based memory element in a respective one of first and second memory banks. Since the data values are stored alternately in the first and second hold registers, each hold register is updated at most every other cycle period of the clock signal. Consequently, the data values stored in the first and second hold registers can be asserted at the input of latch-based memory elements for a time greater than a single cycle period of the clock signal. This allows sufficient setup and hold time to store the data values in the latch-based memory elements of the first and second memory banks without having to reduce the input data rate.

The apparatus of the present invention includes first and second data hold registers in which data values are alternately stored, first and second address hold registers in which memory address values corresponding to the data values are alternately stored, and first and second memory banks containing latch-based memory elements addressed by the address values in the first and second address hold registers and written with the data values stored in the first and second data hold registers.

In one embodiment of the present invention, a control unit and a write-address counter are used to alternately enable even and odd hold registers and to alternately address even and odd latch-based memory banks. The write-address counter is either an up or down counter which is incremented with each new data value to be written. Since the least significant bit of the write-address counter output alternates between logical high and low states, the least significant bit of the write-address counter is asserted at an input of the control unit to alternately enable the even and odd hold registers and also to alternately output an even latch enable pulse and an odd latch enable pulse to the even and odd memory banks, respectively. The remaining bits of the write-address counter are stored in an enabled one of the address hold registers and demultiplexed to select a particular one of the latch-based memory elements in either the even or odd memory bank.

DETAILED DESCRIPTION OF THE INVENTION

A method and apparatus for storing data in a plurality of latch-based memory elements are described below. Although numerous specific details are set forth in order to provide a thorough understanding of the present invention, it will be apparent to one skilled in the art that the present invention may be practiced without such specific details.

Latch-Based Memory Element

Figure 1:
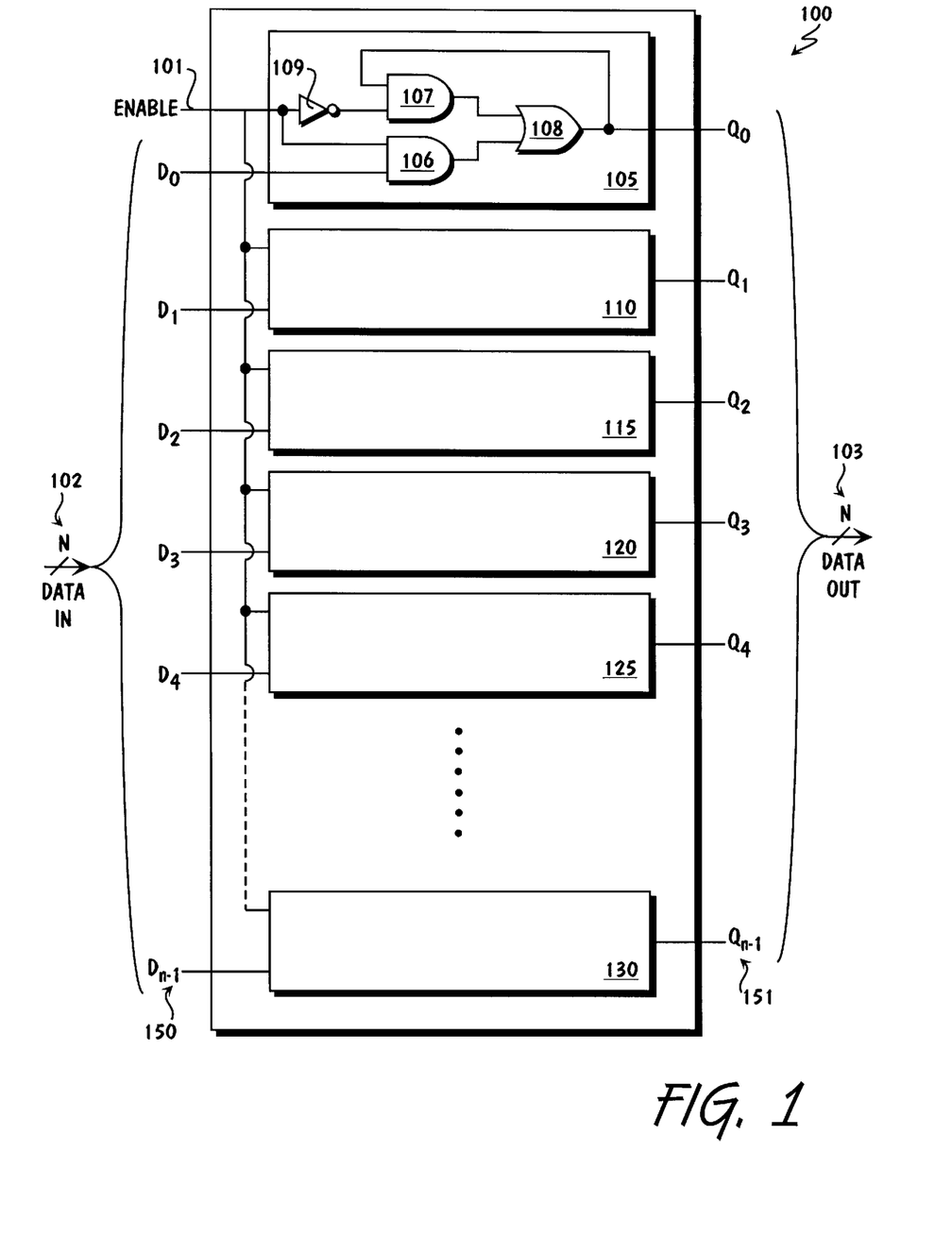
FIG. 1 is a logic diagram of a transparent latch used to hold an N-bit-wide word of data.

FIG. 1 is a logic diagram of a transparent latch 100 used to hold an N-bit-wide word of data. Latch 100 includes data inputs $D_0$–$D_{N-1}$, latch elements (105, 110, 115, 120, 125 and 130), data outputs $Q_0$–$Q_{N-1}$ and a latch enable input 101. Each word of data is delivered to latch 100 via data input path 102 as a plurality of parallel bits. The conductor of each bit in data path 102 is coupled to a respective one of data inputs $D_0$–$D_{N-1}$. Similarly, data is received from data outputs $Q_0$–$Q_{N-1}$ via data output path 103. Data inputs $D_0$–$D_{N-1}$ are collectively referred to as the "data input" 150 of latch 100 and data outputs $Q_0$–$Q_{N-1}$ are collectively referred to as the "data output" 151 of latch 100.

Each of the latch elements (105, 110, 115, 120, 125, 130) is coupled to the latch enable input 101 and to a respective one of data inputs $D_0$–$D_{N-1}$. Also, each of the latch elements (105, 110, 115, 120, 125, 130) operates in the same way so that, in FIG. 1, only the internal logic of latch element 105 has been depicted.

Referring now to latch element 105, when the signal at latch enable input 101 is at a logical high voltage ("high"), latch element 105 is said to be "enabled" and the signal present at input $D_0$ will be passed by AND gate 106 and presented at the input of OR gate 108. Since the signal at the latch enable input 101 is inverted before being asserted at the input of AND gate 107, the output of AND gate 107 will be at a low logical voltage ("low"). Consequently, so long as a high signal is present at latch enable input 101, one input to OR gate 108 will be low and the other input to OR gate 108 will track the signal present at $D_0$. Since the output of OR gate 108 drives $Q_0$, output $Q_0$ tracks input $D_0$ so long as a high signal is present at latch enable input 101. It will be appreciated that the logic in latch element 105 could easily be reconfigured to enable the latch when a low logical voltage ("low") signal is present at latch enable input 101. For the sake of simplicity, however, an active high latch enable is assumed herein.

When latch enable signal 101 transitions from high to low, the output of AND gate 106 will be forced low and the output of AND gate 107 will be equal to the fed-back output of OR gate 108. Thus, if the output of OR gate 108 is high when the latch enable signal goes low, the output of AND gate 107 will become high and continue to drive the OR gate 108 high. If the output of OR gate 108 is low when the latch enable signal goes low, the output of AND gate 107 will remain low so that the output of OR gate 108 will remain low. In other words, the output of OR gate 108 is latched at the trailing edge of the latch enable signal.

The essential difference between latch 100 and a flip-flop used for an equivalent purpose is that latch 100 does not have a clock input that must be toggled. This means that logic elements of latch 100 don't have to go through a level sensing state in every clock cycle. This is significant because the level sensing state occurs at a mid-voltage point (a voltage between the logical high and low voltages) at which current draw is the greatest. Consequently, latch 100 requires less power than a flip-flop used for the same purpose.

Latch Timing Parameters

Figure 2:
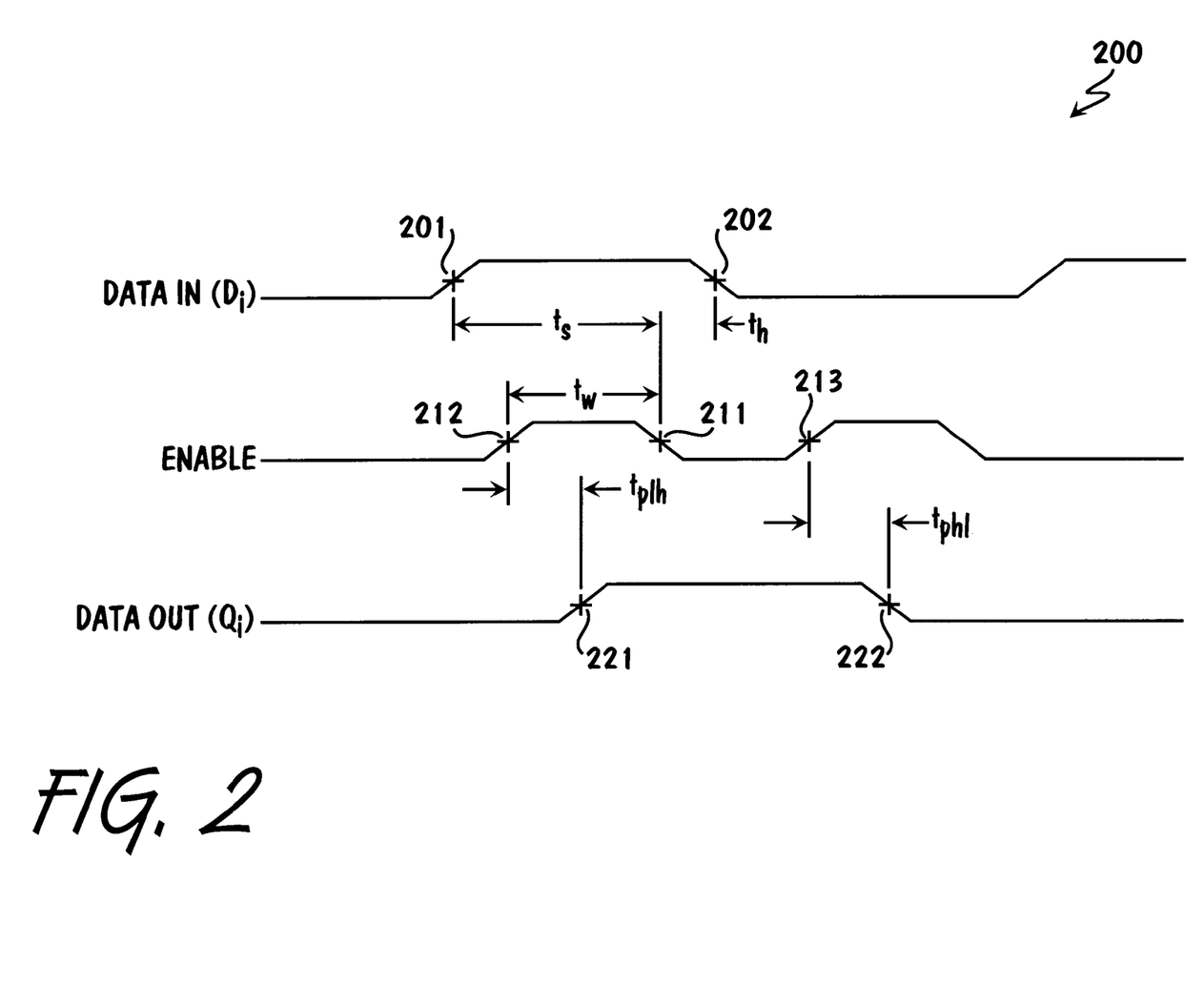
FIG. 2 is a waveform diagram illustrating latch signal timing parameters.

FIG. 2 is a waveform diagram 200 showing certain timing parameters which must be satisfied to ensure proper operation of latch 100 of FIG. 1. To start, the data setup time, $t_s$, is the time between a trailing edge 211 of the latch enable signal and the most recent preceding data transition 201. The input data signal must remain stable for some minimum $t_s$ to be transferred to the latch output. The data hold time, $t_h$, is the time between a trailing edge of the latch enable signal 211 and the next data transition 202. The input data signal must be held stable for some minimum $t_h$ to be latched at the latch output. The latch enable time, $t_w$, is the time between a rising edge 212 and trailing edge 211 of the latch enable signal. In order for input data to be latched at the latch output, the latch enable signal must remain high for some minimum $t_w$.

Signal propagation delays are also shown in FIG. 2. The propagation delay time required for the data output to transition from low to high, $t_{plh}$, is measured from the rising edge 212 of the latch enable signal to the rising edge 221 of the latch data output. Similarly, the propagation delay time required for the data output to transition from high to low, $t_{phl}$ is measured from the rising edge of the enable signal 213 to the falling edge of the data output 222.

Asserting the Latch Enable Pulse

Figure 3:
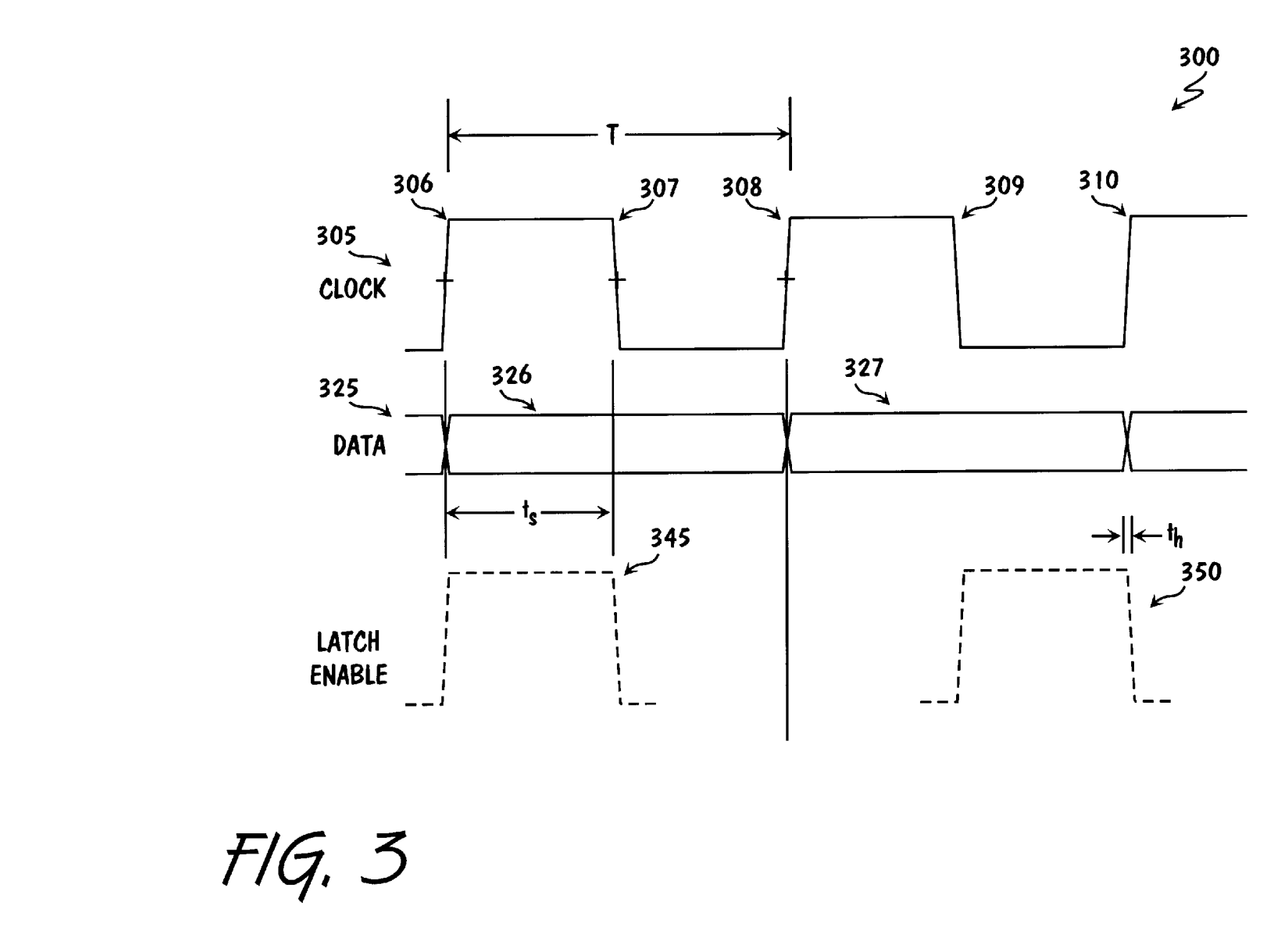
FIG. 3 is a waveform diagram illustrating the relationship between a data clock, incoming data and a latch enable pulse.

FIG. 3 is a waveform diagram 300 illustrating the difficulty which arises when a transparent latch is used as a storage element. In diagram 300 data signal 325 is updated on each rising edge (306, 308, 310) of clock signal 305 so that a new data value is presented for storage each clock cycle. The task presented is to enable the latch so that sufficient setup and hold time are provided to latch the data. One possibility is shown by latch enable pulse 345. The latch enable pulse is driven high by the same clock edge 306 which gates new data value 326. The latch enable pulse then goes low at the next falling edge 307 of the clock pulse. A potential problem with this arrangement is that the latch setup time is only one-half the cycle period (T) of the clock signal. If the cycle period (T) is short, the latch setup time may be insufficient. By comparison, if the data is simply clocked into a flip-flop at the end of each clock cycle, a full cycle period of setup time is achieved.

To increase the setup time, a latch enable pulse 350 synchronized with the second half of a clock cycle could be used. The enable pulse 350 is driven high at the trailing edge 309 of the clock signal 305 and then is driven low at the next rising edge 310 of the clock signal 305. In this way, the data value 327 is present at the latch input for a full clock cycle before being latched at the trailing edge of enable pulse 350.

However, since the trailing edge of pulse 350 coincides with the delivery of a new data value, this arrangement reduces the data hold time to almost zero and can result in latching of erroneous data.

It will be appreciated that, since data is clocked into a flip-flop at a clock edge which coincides with the delivery of new data, flip-flops potentially suffer from the same hold-time problem exhibited by latches. In general, the problem is one of using gate-delay in the storage element to establish sufficient hold-time. Since flip-flops tend to have a greater number of gates, and therefore greater gate delay between input and output, the flip-flop gate delay is usually adequate to allow input data to be stored at the same clock edge at which the input data changes state. Also, since circuit elements supplying input data are usually flip-flops, matched timing characteristics between data source and data storage result when flip-flops are the data storage element. This reduces the potential for race conditions. By contrast, latches have reduced gate delay and mismatched timing characteristics as compared to a flip-flop data source and therefore are more prone to race conditions when gate delay alone is used to establish the data hold time.

A number of variations of the timing schemes of diagram 300 can be imagined. For example, the latch could be enabled with the rising edge 308 of clock signal 305, and then disabled sometime after trailing edge 309, but before rising edge 310 of clock signal 305. There are two problems with this scheme. First, the trailing edge of the latch enable pulse 350 must be skewed relative to the rising edge 310 of the clock signal 305. This control-signal-to-clock skewing complicates the logic design and can give rise to race conditions. Second, the setup time is reduced from the full clock cycle of setup time available when a flip-flop is used.

Finally, the cycle period of clock signal 305 could be increased so that longer data setup and hold times could be provided. Of course, increasing the clock cycle period means reducing the rate at which data is received. This is almost always undesirable.

In the present invention, instead of relying on gate delay to ensure data hold-time, a full clock cycle of setup-time and a full clock cycle of hold time are achieved by design without reducing the input data rate. This is accomplished by exploiting the fact that in a sequentially written memory like a FIFO buffer memory is addressed alternately at odd and even locations. By storing odd and even data values and their respective buffer memory addresses alternately in a set of registers, it becomes possible to assert the data value at the input of a latch-based memory element for a time greater than the single clock cycle period in which the data was delivered.

Overview of an Apparatus According to the Present Invention

Figure 4:
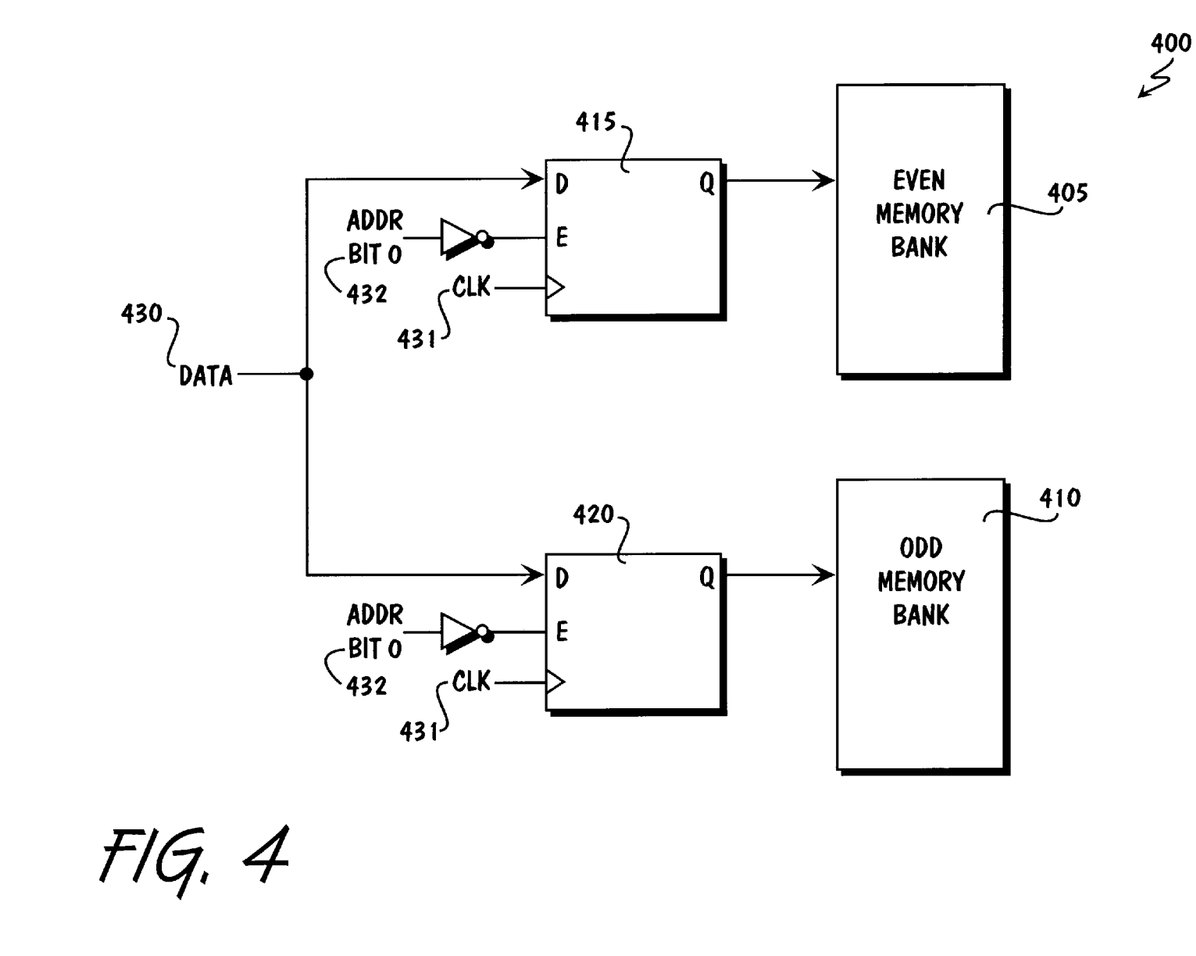
FIG. 4 is a diagram of a sequentially written memory circuit that achieves increased latch setup and hold time.

FIG. 4 is a diagram of a sequentially written memory circuit 400 that achieves increased latch setup and hold time without requiring the input data rate to be reduced. Circuit 400 includes separate memory banks 405 and 410 for even and odd addressed memory locations, and temporary storage elements, referred to as "data hold registers" 415 and 420, to receive data to be written to the even and odd memory banks (405 and 410), respectively. Data hold registers 415 and 420 are designed to store data received via data path 430 at the at each rising edge of clock signal 431, but only if the signal present at the enable input (E) is active. Once stored in register 415 or 420, a data value is asserted at the output, Q, of the register to one of a plurality of memory elements in either even memory bank 405 or odd memory bank 410.

With each new data value, the FIFO buffer address to which the data value is to be written is incremented. As a result, the FIFO buffer address alternates between even and odd values so that the least significant bit 432 of the FIFO buffer address is toggled between high and low logic levels. By asserting the least significant FIFO buffer address bit 432 at the enable input of data hold register 420, a new data value is stored in data hold register 420 at the rising edge of clock 431 for each odd memory address. Similarly, by asserting the least significant address bit 432 at the enable input of data hold register 415 after it has been inverted by inverter 416, a new data value is stored in data hold register 415 at the rising edge of clock 431 for each even memory address. In this way, data values are stored alternately in data hold registers 415 and 420 (referred to as "even" and "odd" data hold registers), and the data value thus stored is asserted at the input of a respective one of the memory elements in memory banks 405 and 410 for more than one cycle period of the clock signal 431. More specifically, assuming that a new data value and a new address is presented to memory circuit 400 every clock cycle, data hold registers 415 and 420 will each assert values to be written to respective even and odd memory banks 405 and 410 for two cycle periods of clock signal 431. In this way, sufficient setup and hold time is achieved to allow latch-based memory elements to be used in even and odd memory banks 405 and 410.

Timing Diagram of Circuit 400

Figure 5:
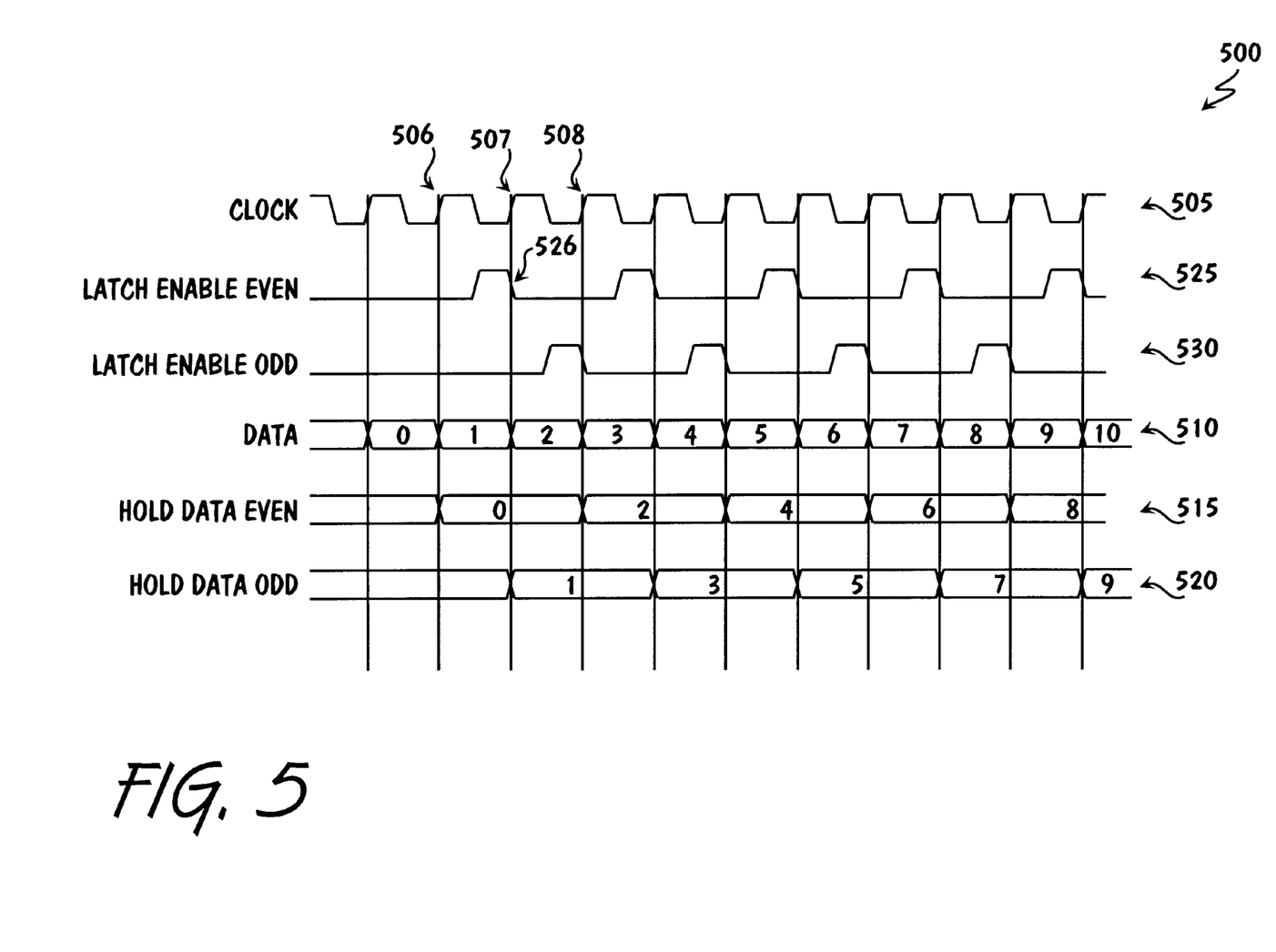
FIG. 5 is a waveform diagram corresponding to the sequentially written memory circuit of FIG. 4.

FIG. 5 is a waveform diagram 500 corresponding to memory circuit 400. On each rising edge of the clock signal 505, a new data value is presented for storage in one of the two memory banks (405 and 410 of FIG. 4). Each of the data values received in data signal 510 has been enumerated in FIG. 5 for correlation with the data values output by the even and odd data hold registers (415 and 420 of FIG. 4). At each rising edge of the clock signal 505 that follows receipt of a data value, the data value is stored in either an even or odd data hold register. For example, at rising edge 506 of clock signal 505, data value 0 of data signal 510 is stored in the even data hold register. This is indicated by signal 515 which represents the output of the even data hold register. Similarly, after rising edge 507, data value 1 is output by the odd data register as indicated by signal 520.

Since the data value stored in either the odd or even register is updated only on alternate (every other) clock cycles, the output of the odd and even data hold registers (signals 515 and 520, respectively) is maintained for two complete cycle periods of clock signal 505.

Since each data value is output by one of the data hold registers for two clock cycles, it becomes possible to achieve a full clock cycle of latch setup time and a full clock cycle of latch hold time. For example, data value 0 is output by the even data hold register for the two clock cycle period bounded by rising edges 506 and 508 of clock signal 505. By asserting a latch enable signal 525 to an even bank of latch-based memory elements so that the trailing edge 526 of the latch enable signal coincides with the rising edge 507 of clock signal 505, the clock cycle between rising edges 506 and 507 is the data setup time and the clock cycle between rising edges 507 and 508 is the data hold time. Similarly, a full clock cycle of latch setup time and a full clock cycle of latch hold time is provided for each of the values to be written at odd-addressed buffer locations by odd latch enable signal 530.

It will be appreciated that while the circuit of FIG. 4 and the waveform diagram of FIG. 5 have been described in terms of alternating storage of data values between two data hold registers, more generally any number of data hold registers greater than one can be used. Of course, additional memory partitions and address hold registers (discussed further below) would also be required. In the general case where N data hold registers are used, every $N^{th}$ one of the data values would be stored in a given hold register every $N^{th}$ clock cycle. As is the case in data hold register signals 515 and 520 of FIG. 5, the outputs of the N data hold registers would be out of phase with one another by X cycle periods of the clock signal, X being at least one.

Circuit Including Address Generation and Decode Logic

Figure 6:
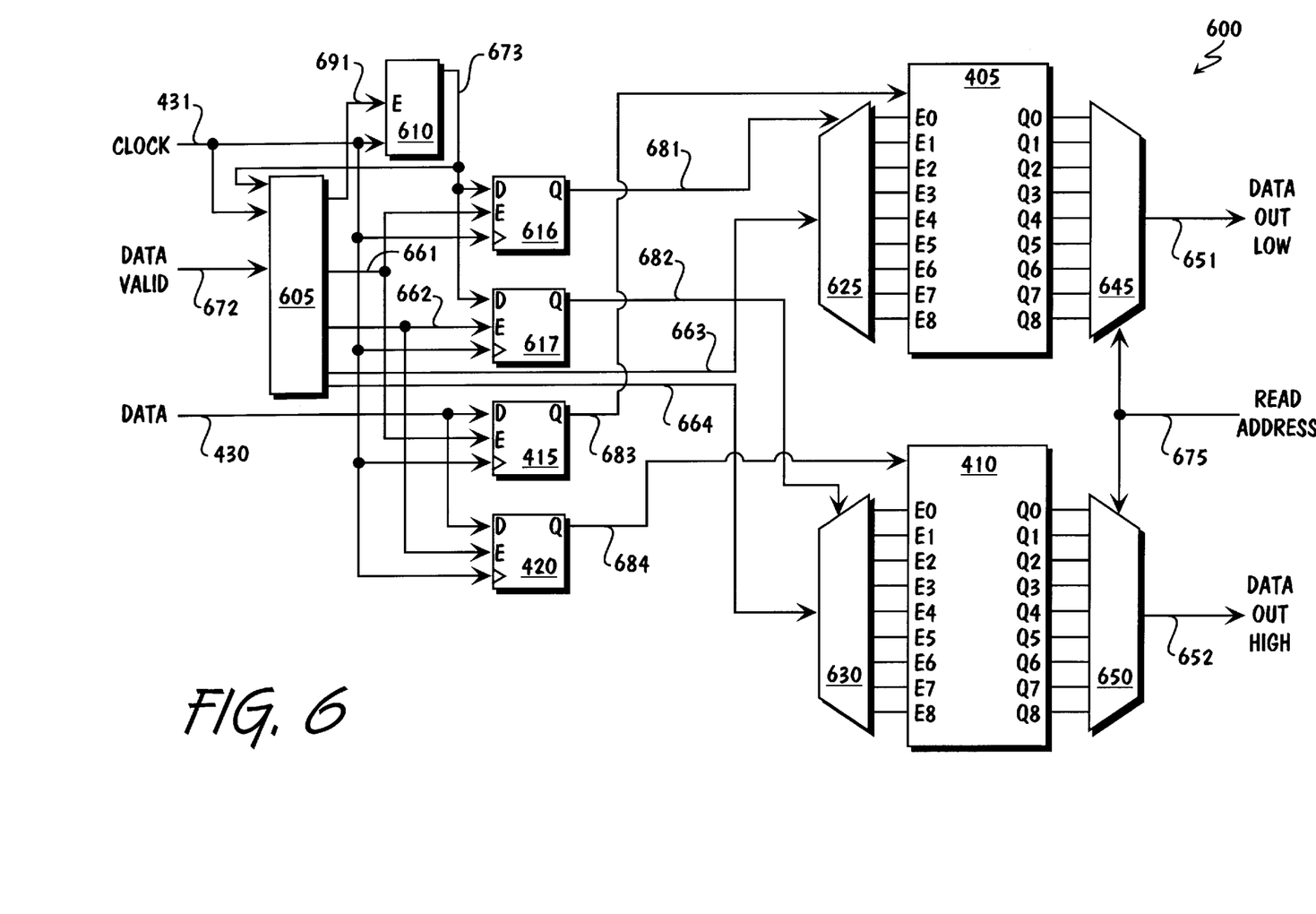
FIG. 6 is a diagram of a latch-based sequentially written memory according to the present invention.

FIG. 6 is a diagram of a latch-based sequentially written memory 600 according to the present invention. Sequentially written memory 600 is an eighteen-byte circular queue and includes a write-address counter 610 to repeatedly generate a sequence of write addresses from zero to seventeen, a control unit 605 to control which of two latch-based memory banks 405 and 410 is written, data hold registers 415 and 420, address hold registers 616 and 617, latch enable demultiplexers 625 and 630, and read select multiplexers 645 and 650. Although an eighteen byte queue is implemented, it will be readily appreciated that the data-width and number of latch-based memory elements in memory banks 405 and 410 could be increased to implement a larger memory.

Clock signal 431 is asserted at the respective clock inputs of the write-address counter 610, control unit 605, even and odd data hold registers (415 and 420) and even and odd address hold registers (616 and 617). A data valid signal 672 is applied to the input of the control unit to indicate whether the data value present on data path 430 is should be queued. If the data valid signal is active, then control unit 605 will assert a count enable signal via signal path 691 to enable the write-address counter 610. If enabled, the write-address counter 610 will increment the count output asserted on signal path 673 at the next rising edge of clock signal 431. Write-address counter 610 may be either an up-counter or a down-counter and herein the expression "incrementing the write-address counter" includes decrementing a down-counter or incrementing an up-counter, as the case may be. The count output 673 of write-address counter will automatically wrap to zero when the maximum queue address is reached, in this case seventeen (of course, a zero-to-seventeen wrap would occur if write-address counter 610 is a down-counter).

Signal path 673, which carries the count output of the write-address counter 610, is fed back into the control unit 605 to allow the control unit 605 to determine whether the even or odd bank of transparent latches (405 and 410, respectively) is to be written. It will be appreciated that only the least significant bit of the count output by write-address counter 610 need be provided to the control unit for this purpose (of course, in the general case where N memory banks, data hold registers and address hold registers are used, $\log_2 N$ address bits must be fed back to the control unit 605). If the count output, and hence the buffer address to be written, is even, then control unit 605 drives output 661 high to enable even address hold register 616 to store the write address (the output of counter 610) and to enable the even data hold register 415 to store the data value received via data path 430. At the next rising edge of the signal at clock input 431, the data value received via data path 430 is gated into even data hold register 415 and the count output at signal path 673 is gated into even address hold register 616. Similarly, if the count output via signal path 673 is odd, control unit 605 will drive output 662 high to enable a new data value into odd data hold register 420 and the count value into odd address hold register at the next rising edge of the signal at clock input 431.

Assuming that data and address values have been stored in their respective hold registers, control unit 605 asserts either an even latch enable signal via path 663 or an odd latch enable signal via path 664 to enable a latch-based memory element in either even memory bank 405 or odd memory bank 410, respectively. The specific latch-based memory element enabled is determined by which latch enable signal is asserted (even via path 663 or odd via path 664) and the demultiplexing input received at the even and odd latch enable demultiplexers 625 and 630 via respective signal paths 681 and 682. The demultiplexing input is determined by the address value stored in the corresponding address hold register (616 or 617). Together the control unit 605, the address hold registers 616 and 617, and the latch enable demultiplexers 625 and 630 effectuate address decode logic for the latch-based memory banks 405 and 410. Since the manner in which the output of the even and odd address hold registers (616 and 617) is used to drive the output of latch enable demultiplexers (625 and 630) is the same, only the operation of the even address select path is described.

Assume that even latch demultiplexer 625 receives a latch enable signal from control unit 605 via signal path 663. The even latch demultiplexer 625 will also receive the address stored in even address hold register 616 via signal path 681 to drive high a specific one of the enable inputs $E_0$–$E_8$ of the even latch-based memory bank 405. For example, assume that the count output by write-address counter 610 is eight, 01000 in binary notation. The zero-valued least-significant bit causes control unit 605 to assert a latch enable signal via path 663 to latch demultiplexer 625. At the same time, the remaining bits of the count value, stored and output by even address hold register 616, select one of the demultiplexer 625 outputs coupled to the even latch bank 405 enable inputs $E_0$–$E_8$. In the embodiment depicted in FIG. 6, the least significant bit of the count value is truncated from the count value stored in the address hold registers 616 and 617. As a result, the even address register contains four (0100) instead of eight (01000). Thus, the value received at the even latch enable demultiplexer 625 via signal path 681 is four (0100), and the latch corresponding to enable input $E_4$ is enabled.

In the circuit 600 of FIG. 6, each of the enable inputs $E_0$–$E_8$ of the even and odd latch banks 405 and 410 enable a full byte of data to be latched. Thus, at the trailing edge of the signal on the even latch enable input 663, the value output by the even data hold register 415 via signal path 683 is latched in the selected latch-based memory element.

In one embodiment of the present invention, a pair of read multiplexers 645 and 650 are provided to select one of the outputs $Q_0$–$Q_8$ from each of the latch-based memory banks 405 and 410. A read address is supplied via signal path 675 to select the particular output to be read from each of the memory banks 405 and 410, and a data value is read from each of the banks simultaneously. Since the data stored in each latch is one byte wide, a sixteen-bit wide data value is read. The least significant byte is output via data output path 651 and the most significant byte is output via data output path 652. It will be appreciated that other read and write data-widths could also be achieved.

Timing Diagram of Circuit 600

Figure 7:
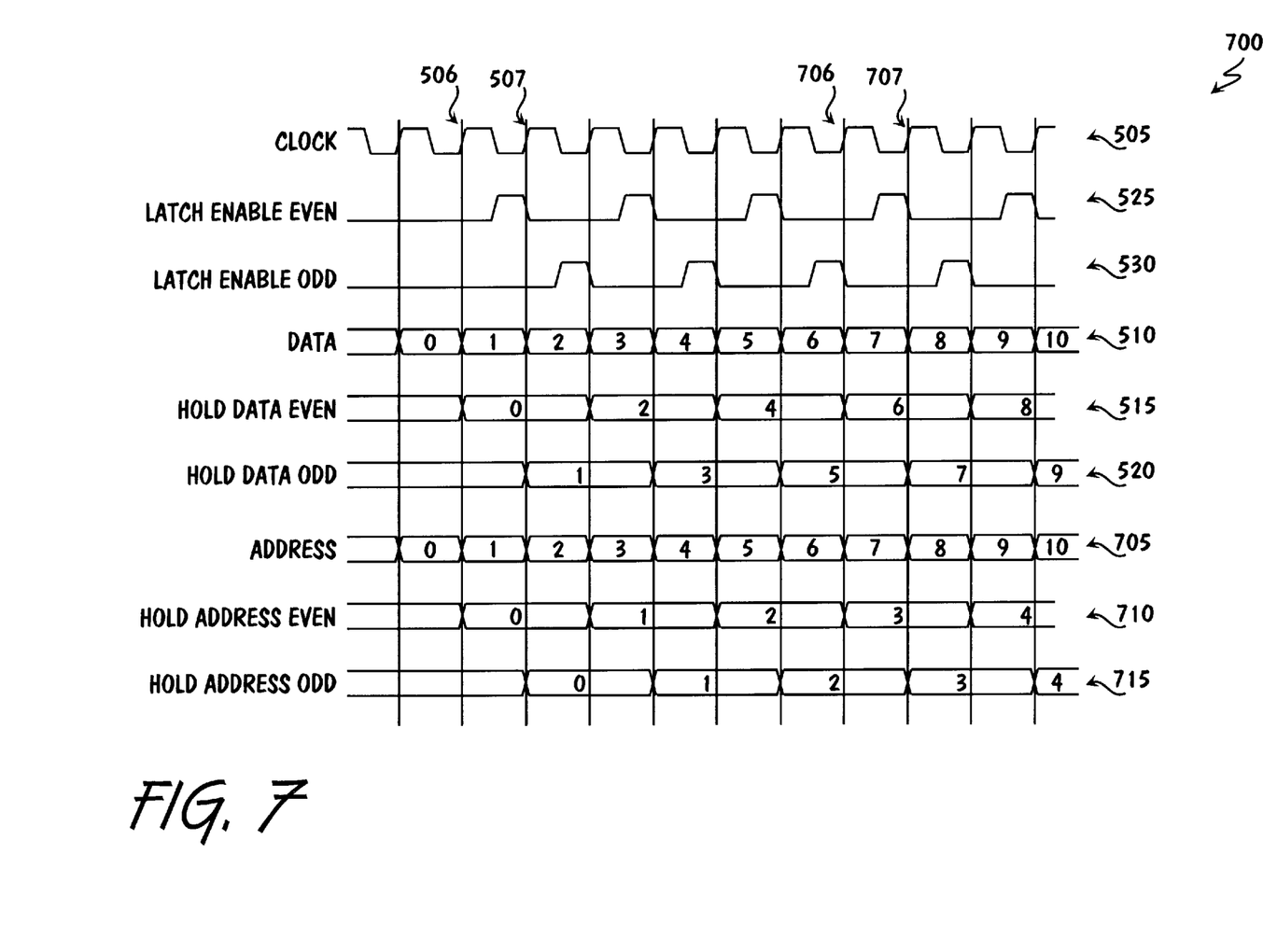
FIG. 7 is a waveform diagram corresponding to the sequentially written memory circuit of FIG. 6.

FIG. 7 is a waveform diagram 700 corresponding to the sequentially written memory 600 of FIG. 6. Waveform diagram 700 includes the same signals depicted and described in FIG. 5, except that address signal 705 and even and odd address hold register output signals 710 and 715 have been added. The memory address values represented by address signal 705 have been included in diagram 700 to illustrate the relationship between the address output by the write-address counter (610 of FIG. 6) indicated by signal 705 and the values stored in even and odd address hold registers (616 and 617 of FIG. 6) indicated by signals 710 and 715, respectively.

Referring still to FIG. 7, at the rising edge 506 of clock signal 505, the even address value, zero, is latched in the even address hold register as indicated by signal 710. As with the even data hold register, the even address hold register asserts the value stored therein for two cycle periods of the clock signal 505. At rising edge 506, the address is incremented so that an odd address value, one, is stored in the odd address hold register at the next rising edge 507 of the clock signal 505. As stated above, in one embodiment of the present invention the least significant bit of the address value represented by signal 705 is not stored in the address hold registers, but rather is used to control which set of address and data hold registers (even or odd) is to be enabled and which latch enable signal (even or odd) is to be asserted during a given cycle period of clock signal 505. Consequently, the address value stored in the odd address hold register and the even hold register after a given rising edge of the clock signal 505 is the value indicated by the address signal in the preceding cycle of clock signal 505, but shifted right by one bit. For example, after rising edge 507 of clock signal 505, a zero valued address (00001→0000) is stored in the odd address register; after rising edge 706 of clock signal 505, address value three (00110→0011) is stored in the even address register; and after rising edge 707 of clock signal 505, address value three (00111→0011) is stored in the odd address register. This is indicated in FIG. 7 by the address values shown on the output signals of the even and odd address hold registers 710 and 715.

Flow Diagram of a Method According to the Present Invention

Figure 8:
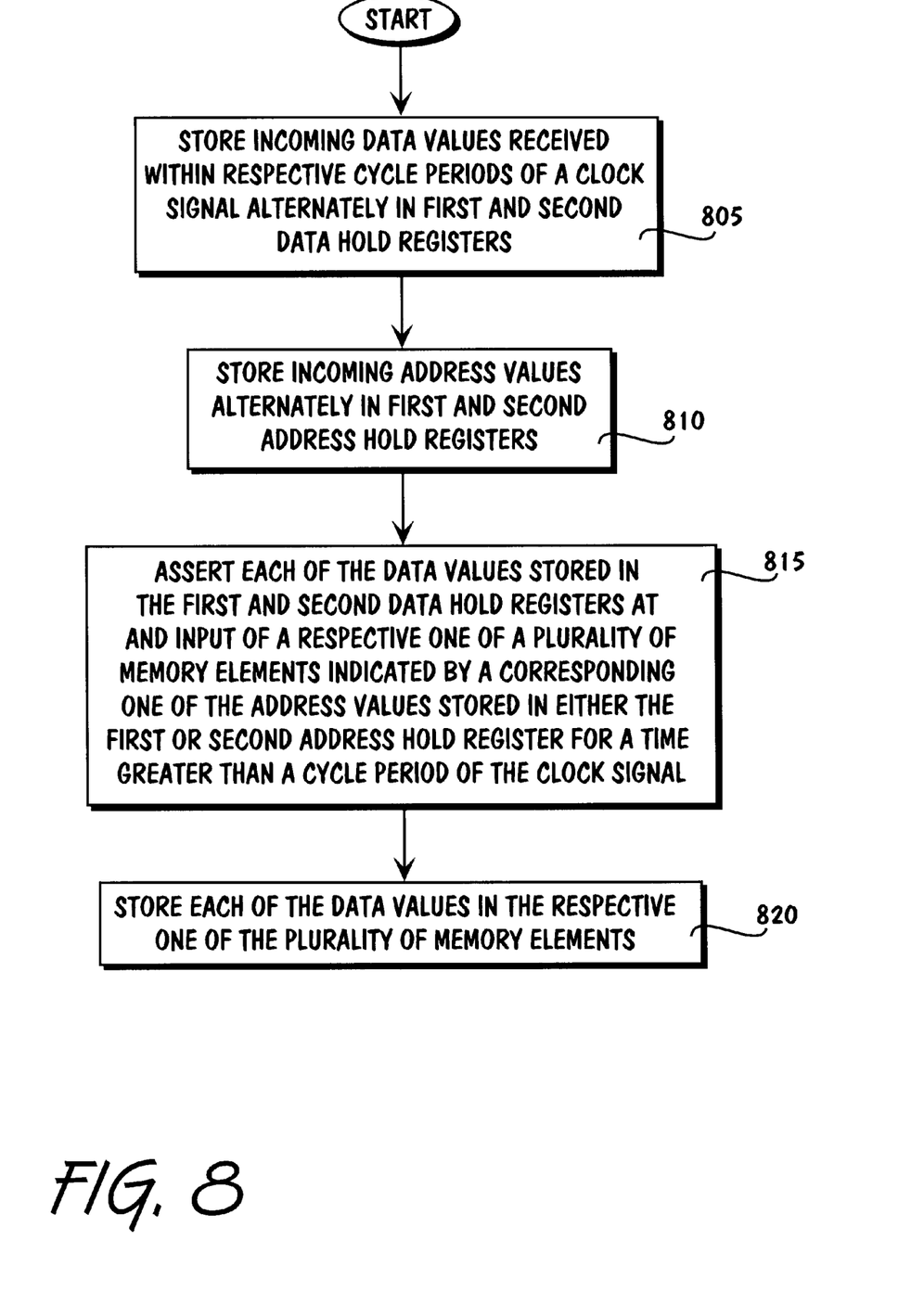
FIG. 8 is a flow diagram of a method for storing data in a plurality of latch-based memory elements.

FIG. 8 is a flow diagram of a method for storing data in a plurality of latch-based memory elements according to the present invention. At step 805, data values received within respective cycle periods of a clock signal are stored alternately in first and second data hold registers. In step 810, address values are stored alternately in first and second address hold registers. Each address value is stored in one of the first and second address hold registers during the same cycle period of the clock signal in which the corresponding data value is stored in one of the first and second data hold registers. At shown in step 815, each data value stored in the first and second data hold registers is asserted at an input of a respective one of a plurality of memory elements for a time greater than a cycle period of the clock signal. The respective one of the plurality of memory elements at which a given data value is asserted is indicated by the corresponding one of the address values stored in the either the first or second address hold register. At step 820, each of the data values is stored in the respective one of the plurality of memory elements.

A method and apparatus for storing data in a plurality of latch-based memory elements are thus described. While the present invention has been described in particular embodiments and through particular examples, the present invention should not be construed as limited by such embodiments and examples, but rather construed according to the following claims.

What is claimed is:

1. A method for storing data values, said method comprising:

storing the data values alternately in first and second hold registers;

asserting each data value stored in the first and second hold registers at an input of a respective memory element of a plurality of memory elements for a time greater than a cycle period of a clock signal to satisfy a setup time requirement for the respective memory element during a first cycle period of the clock signal and to satisfy a hold time requirement for the respective memory element during a second cycle period of the clock signal; and storing each of the data values in its respective one of the plurality of memory elements.

2. The method of claim 1 wherein storing the data values alternately in first and second hold registers comprises storing, in successive cycle periods of the clock signal, a first data value in the first hold register and then a second data value in the second hold register.

3. The method of claim 1 wherein storing the data values alternately in first and second hold registers comprises storing every $N^{th}$ one of the data values in the second hold register at every $N^{th}$ cycle period of the clock signal, N being at least two.

4. The method of claim 3 wherein storing the data values alternately in the first and second hold registers further comprises storing every $N^{th}$ one of the data values in the first hold register at every $N^{th}$ cycle period of the clock signal, starting with the $(N-X)^{th}$ one of the data values, X being at least one.

5. The method of claim 3 wherein asserting each of the data values stored in the first and second hold registers comprises asserting each of the data values stored in the first and second hold registers during N cycle periods of the clock signal.

6. The method of claim 1 wherein asserting each of the data values stored in the first and second hold registers comprises concurrently asserting a first data value stored in the first hold register and a second data value stored in the second hold register.

7. The method of claim 6 wherein asserting each of the data values stored in the first and second hold registers further comprises concurrently asserting a third data value stored in the first hold register and the second data value stored in the second hold register.

8. The method of claim 1 wherein asserting each of the data values stored in the first and second hold registers at an input of a respective one of a plurality of memory elements comprises asserting each of the data values at an input of a respective one of a plurality of transparent latches.

9. The method of claim 1 wherein asserting each of the data values stored in the first and second hold registers at an input of one of a plurality of memory elements comprises:

asserting each of the data values stored in the first hold register at an input of a transparent latch of a first bank of transparent latches; and asserting each of the data values stored in the second hold register at an input of a transparent latch of a second bank of transparent latches.

10. An apparatus for storing data values received within respective cycle periods of a clock signal, said apparatus comprising:

first and second data hold registers configured to alternatively receive the data values and to output respective data signals representing the data values for a time greater than a cycle period of said clock signal;

first and second address hold registers configured to alternately receive address values and to output respective address signals;

a first plurality of memory elements configured to store data values indicated by the data signals output by said first data hold register at locations indicated by the address signals output by said first address hold register;

a second plurality of memory elements configured to store data values indicated by the data signals output by said second data hold register at locations indicated by the address signals output by said second address hold register; and a write-address counter coupled to said first and second address hold registers, said write-address counter being configured to output respective count values that are stored alternately in the first and second address hold registers, the respective count values indicating locations in the first and second plurality of memory elements.

11. The apparatus of claim 10 wherein said first plurality of memory elements is a bank of transparent latches.

12. The apparatus of claim 11 wherein said apparatus further comprises address decode logic coupled to receive address signals from said first address hold register and to enable transparent latches of the bank of transparent latches indicated by the address signals.

13. The apparatus of claim 10 wherein each transparent latch in said bank of transparent latches is configured to latch a data value represented by a plurality of bits.

14. The apparatus of claim 10 further comprising a controller coupled to receive said clock signal, said controller being configured to enable said first data hold register and said second data hold register to receive a respective one of the data values on alternate cycle periods of said clock signal.

15. The apparatus of claim 14 wherein said controller is further configured to enable said first address hold register and said second address hold register to receive a respective address value on alternate cycle periods of said clock cycle.

16. The apparatus of claim 10 wherein the count value stored in said write-address counter is incremented during each cycle period of said clock.

17. The apparatus of claim 10 wherein the least significant bit of the count value is input to said controller, said controller enabling said first data hold register and said first address hold register to be updated when the least significant bit is in a first state and said controller enabling said second data hold register and said second address hold register to be updated when the least significant bit is in a second state.

18. A method comprising:

storing data values alternately in first and second data hold registers, the data values being received within respective cycle periods of a clock signal;

storing address values alternately in first and second address hold registers, the address values being successive count values output by a write-address counter;

asserting each of the data values stored in the first and second data hold registers at an input of a respective one of a plurality of memory elements for a time greater than a cycle period of the clock signal, the respective one of the plurality of elements being indicated by a respective one of the address values stored in the first and second address hold registers; and storing each of the data values in its respective one of the plurality of memory elements.

19. The method of claim 18 wherein storing the data values alternately in first and second data hold registers comprises storing, in successive cycle periods of the clock signal, a first data value in the first data hold register and then a second data value in the second data hold register.

20. The method of claim 18 wherein storing the data values alternately in first and second data hold registers comprises storing every $N^{th}$ one of the data values in the second data hold register at every $N^{th}$ cycle period of the clock signal, N being at least two.

21. The method of claim 18 wherein asserting each of the data values stored in the first and second data hold registers comprises concurrently asserting a first data value stored in the first data hold register and a second data value stored in the second data hold register.

22. The method of claim 18 wherein asserting each of the data values stored in the first and second hold registers at an input of a respective one of a plurality of memory elements comprises asserting each of the data values at an input of a respective one of a plurality of transparent latches.

* * * * *